United States Patent [19]

Brandstadter

[11] 4,447,073
[45] May 8, 1984

[54] ROAD WHEEL SUSPENSION

[75] Inventor: Jack M. Brandstadter, Royal Oak, Mich.

[73] Assignee: Ex-Cell-O Corporation, Troy, Mich.

[21] Appl. No.: 361,944

[22] Filed: Mar. 25, 1982

[51] Int. Cl.³ .................................................. B60G 11/26
[52] U.S. Cl. ................................................... 280/705
[58] Field of Search ............... 280/683, 702, 705, 709, 280/698

[56] References Cited

U.S. PATENT DOCUMENTS

| 3,047,283 | 7/1962 | Kivell | 280/705 |
| 3,602,470 | 8/1971 | Reynolds | 280/705 |
| 3,614,125 | 10/1971 | Sinclair et al. | 280/705 |
| 4,026,579 | 5/1977 | Foster et al. | 280/705 |
| 4,079,963 | 3/1978 | Siorek | 280/705 |
| 4,113,279 | 9/1978 | Hausenblas et al. | 280/705 |

Primary Examiner—David M. Mitchell
Assistant Examiner—Ross Weaver
Attorney, Agent, or Firm—John C. Evans

[57] ABSTRACT

An in-arm hydropneumatic suspension system includes a road wheel spindle connected to a vehicle hull. A road wheel arm has a spindle housing on one end supported by complementary tapered roller bearings for oscillation on the spindle; the opposite end of the road wheel arm defines an air spring housing for air spring means supporting the sprung mass of the vehicle. Damper components of the suspension unit are located remotely of the air spring at a location in the spindle housing so as to isolate the air spring operation from damper generated heat and wherein damper generated heat is dissipated from crankcase oil in the spindle housing directly to the hull.

6 Claims, 11 Drawing Figures

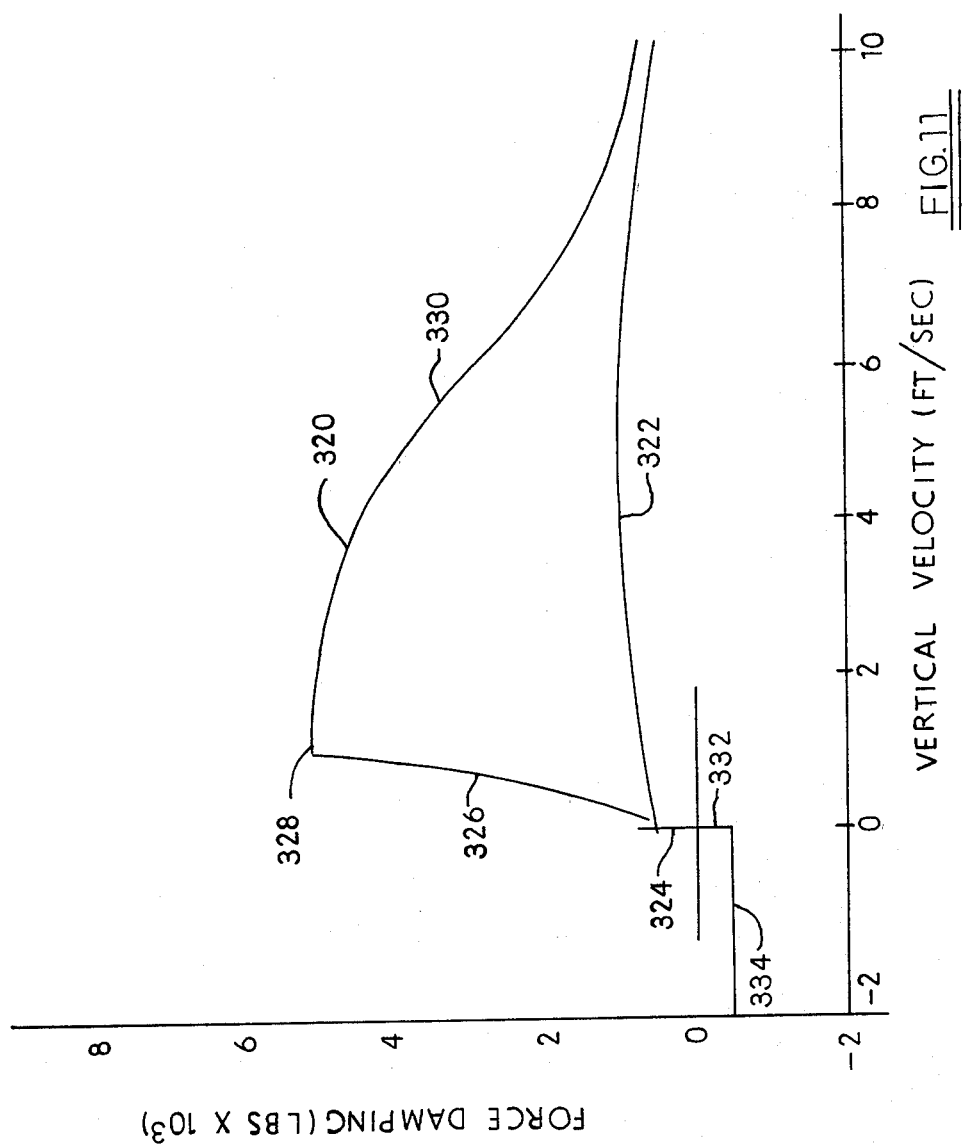

ROAD WHEEL SUSPENSION

FIELD OF THE INVENTION

This invention relates to vehicle suspension systems and more particularly to self-contained externally mounted hydropneumatic suspension systems with gas spring means and friction damper means adaptable for use on existing or new off-road vehicles.

DESCRIPTION OF THE PRIOR ART

Hydropneumatic suspension systems for multiple wheeled vehicles have a hydropneumatic suspension unit (HSU) for each individual wheel. These HSU's in the past consisted of a gas-fluid spring to support the weight of the vehicle and a restriction to the fluid flow to damp the vehicle. These HSU's were either hull mounted or built into the road arm.

Most of the earlier hydropneumatic suspension systems that were successful had hull mounted HSU's which were interconnected to a hydraulic supply in the vehicle. This hydraulic supply in conjunction with a system of control valves permitted the HSU's to adjust or maintain the height and attitude of the vehicle despite changes in the ambient and operating conditions. In addition the hydraulic supply provided a means of replenishing seal leakage and of circulating fluid from the HSU's to a central cooling system. These systems provided vehicles with a versatile, reliable, high performance suspension system which was large, heavy, and expensive. More recently hydropneumatic suspension systems have utilized either hull mounted or in-arm self-contained HSU's. These systems were capable of retrofitting existing vehicles which did not contain a suitable hydraulic supply. They were also suitable for new applications where a high performance suspension is required at a reduced size, weight, and cost. They depended on the integrity of their seals, their ability to dissipate heat, and their spring rate at and near the static position to maintain the height and attitude of the vehicle despite changes in the ambient and operating conditions.

The hull mounted self-contained HSU's depended on fluid flow to a heat exchanger built into the mounting flange to transfer damper valve generated heat to the vehicle's hull. The contamination built in and generated by these fluid passages and the valves therein adversely affected the seals' reliability and durability. The HSU's did not fit in the available space between the vertical side of a vehicle and the road wheel and were heavier and more expensive than mechanical suspension systems.

The in-arm self contained HSU's depended on the surface area of the arm to transfer damper generated heat to the atmosphere. The limited surface area (especially when caked with dried mud) caused excessive temperature increases in the fluid and gas volumes during operation over rough terrain. The unsprung weight of the arm of the in-arm HSU's was higher than that of typical, commonly utilized mechanical systems.

The gas-fluid spring means utilized in both types of HSU had too low a spring rate at and near the static position. This spring rate which resulted from the road arm geometry and the adiabatic expansion and contraction of the gas volume did not properly equilibrate the vehicle for changes in the ambient and operating conditions.

Furthermore, in such systems inherent damping characteristics, which were determined by the valve and line sizes, generated undesirable and excessive forces and heat when the road wheels traversed discrete obstacles (such as a boulder or tree trunk having a steep ramp angle) with the vehicle traveling at moderate to high vehicle speeds. These forces disturb the hull unnecessarily to impair the ride quality and require additional energy absorption to damp such hull disturbances.

SUMMARY OF THE INVENTION

Accordingly, an object of the present invention is to provide an improved, self-contained, in-arm hydropneumatic suspension with spring means having a higher rate at and near the static position than previous HSU systems.

Another object of the present invention is to provide an improved, self-contained, in-arm hydropneumatic suspension unit with spring means remote from a damper and its generated heat and contamination.

Another object of the present invention is to provide an improved self-contained in-arm hydropneumatic suspension unit with an in-spindle damper which is located remotely from a gas volume of a gas spring mechanism and is operated independently of the gas spring mechanism.

Still another object of the present invention is to provide an improved, self-contained in-arm hydropneumatic suspension unit with damper means enclosed within a spindle housing and including means for absorbing more energy at those road arm velocities associated with the pitching and heaving of the hull than at those higher velocities associated with the road wheel traversing a discrete obstacle.

Another object of the present invention is to provide an improved, self-contained, in-arm hydropneumatic suspension with means for absorbing and dissipating damper generated heat without overheating the system.

Still another object of the present invention is to provide an improved, self-contained, in-arm hydropneumatic suspension with means for reducing size, weight, and cost of a structure which does not intrude into the hull and which fits in the available space between the vertical side of the vehicle and the road wheel, and which has a reduced unsprung weight.

According to the invention an in-arm pneumatic spring produces an output force for each vertical position of the road wheel as a function of the initial gas volume and pressure; the adiabatic expansion or contraction of this gas volume; the road arm geometry; and the non-linear mechanism which controls in response to road arm displacement both the effective arm length at which the pneumatic forces act and the displacement of the piston which varies the gas volume. The resultant shaped spring characteristic provides improved static and dynamic suspension system performance. The in-spindle damper is located remotely from the gas volume and is operated independently of the spring mechanism. A non-linear cam which is an integral part of a rotating crankcase housing actuates a piston pump which increases crankcase fluid to a pressure which is a function of the road arm's direction of rotation, displacement, and velocity; and of the pressure-flow characteristics of the hydraulic control system components. The in-spindle damper absorbs energy as a function of this pressure and the friction characteristics at various road arm velocities of the rotary damper. The resultant shaped damper characteristic provides improved dynamic suspension system performance.

The heat generated by the friction damper is transferred to crankcase fluid which is self-pumped through the damper. This heat is then transferred by the circulating fluid to the large mass and area crankcase housing and then to the surrounding atmosphere, and to the large mass spindle and directly through the large area mounting flange to the vehicle hull; thus, efficiently absorbing on a transient basis and dissipating on a steady state basis the heat, minimizing the temperature build-up, and isolating the pneumatic spring from the effects of varying excessive operating temperatures. In addition the spring is shielded from built-in and damper generated contamination.

The construction utilizes the same structural material for different purposes in that it acts in combination as a structure to transmit the road wheel forces to the hull, as a mount and a container for the spring and the damper. Further the structural material acts as an efficient means of absorbing and dissipating the heat generated by the damper. The resultant effect is to provide a suspension unit of reduced size, weight, and cost which does not intrude into the hull's volume under armor, fits in the available space between the sides of typical vehicles (including the most restrictive vertical sided hull) and the road wheel, permits the use of a relatively short road arm with reduced unsprung weight while neither limiting the vertical travel of the road wheel or the track.

These and other objects of the present invention will be more apparent with reference to the following description and drawings of a preferred embodiment of the invention wherein:

FIG. 11 is a graph of the damping torque versus the rotational velocity of the road arm for the present invention.

Figure 1:
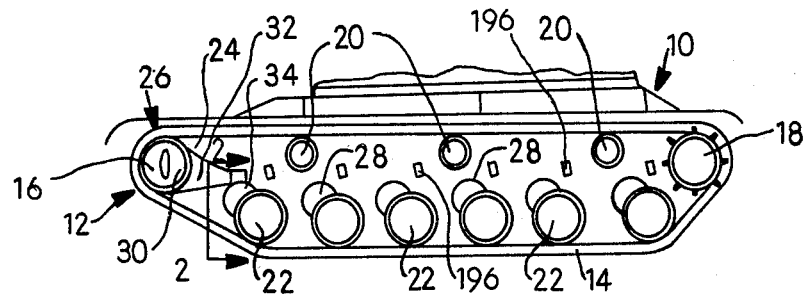
FIG. 1 is a side elevation view of a tracked vehicle with a road wheel suspension system including the present invention.

Referring now to FIG. 1, an armored vehicle 10 is illustrated. It includes two track laying systems 12 only one of which is shown. The system 12 includes a track 14 guided over an idler wheel 16 and a drive sprocket 18. A plurality of support rollers 20 guide the upper reach of the track. The vehicle is suspended by a plurality of road wheels 22, spaced axially along the side wall 24 of the vehicle hull 26. Each road wheel 22 is carried for vertical movement with respect to the hull by a self-contained, externally mounted hydropneumatic suspension unit 28, hereinafter HSU 28. An adjustable track tensioner 30 is coupled between a compensating idler arm 32 and a spindle housing 34 of the forward-most HSU.

The systems 12 are representative of track laying systems improved by the present invention which is equally suitable for use on other track systems or on wheeled vehicles.

Figure 3:
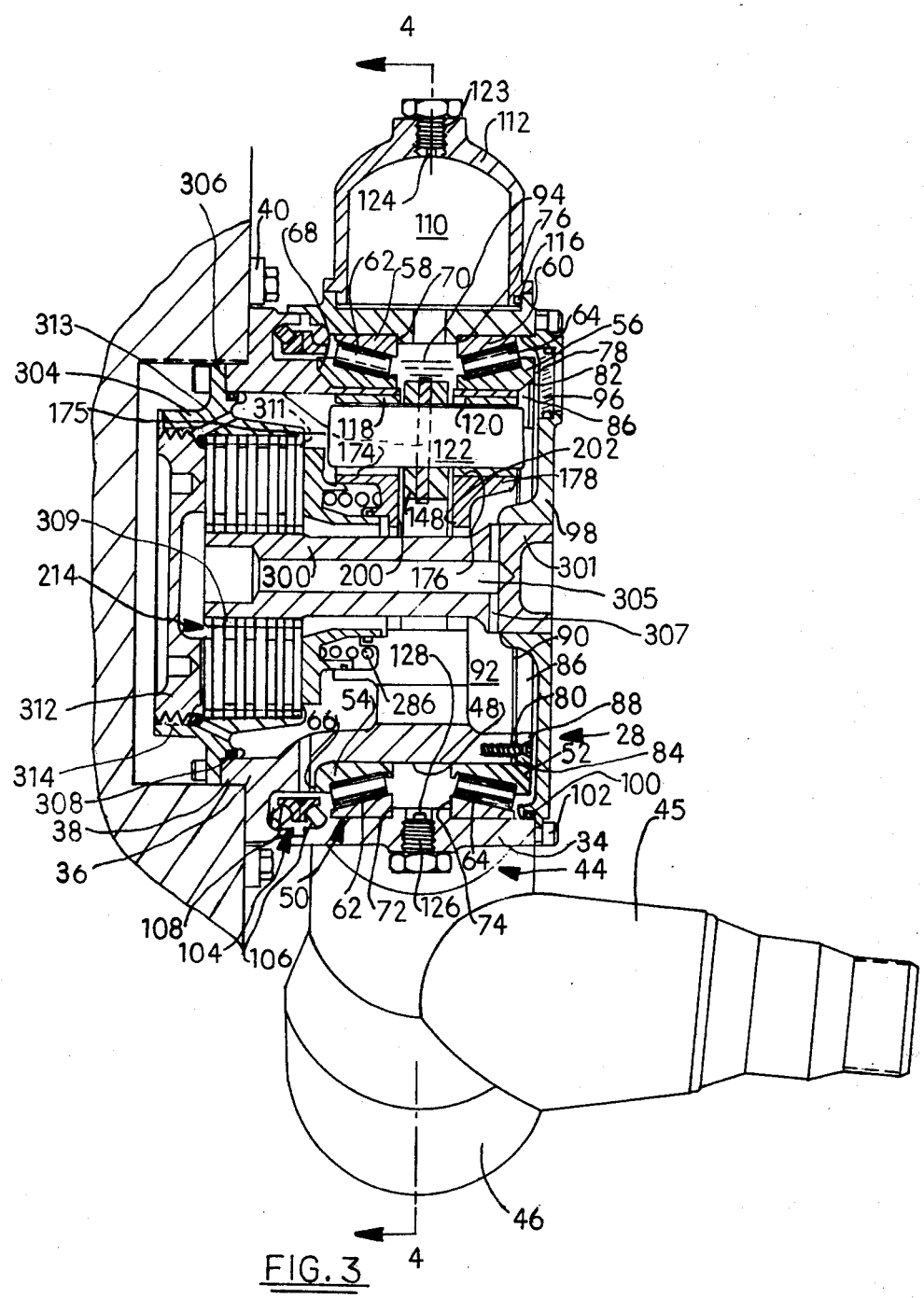
FIG. 3 is a sectional view taken along the line 3—3 of FIG. 2 looking in the direction of the arrows.
Figure 4:
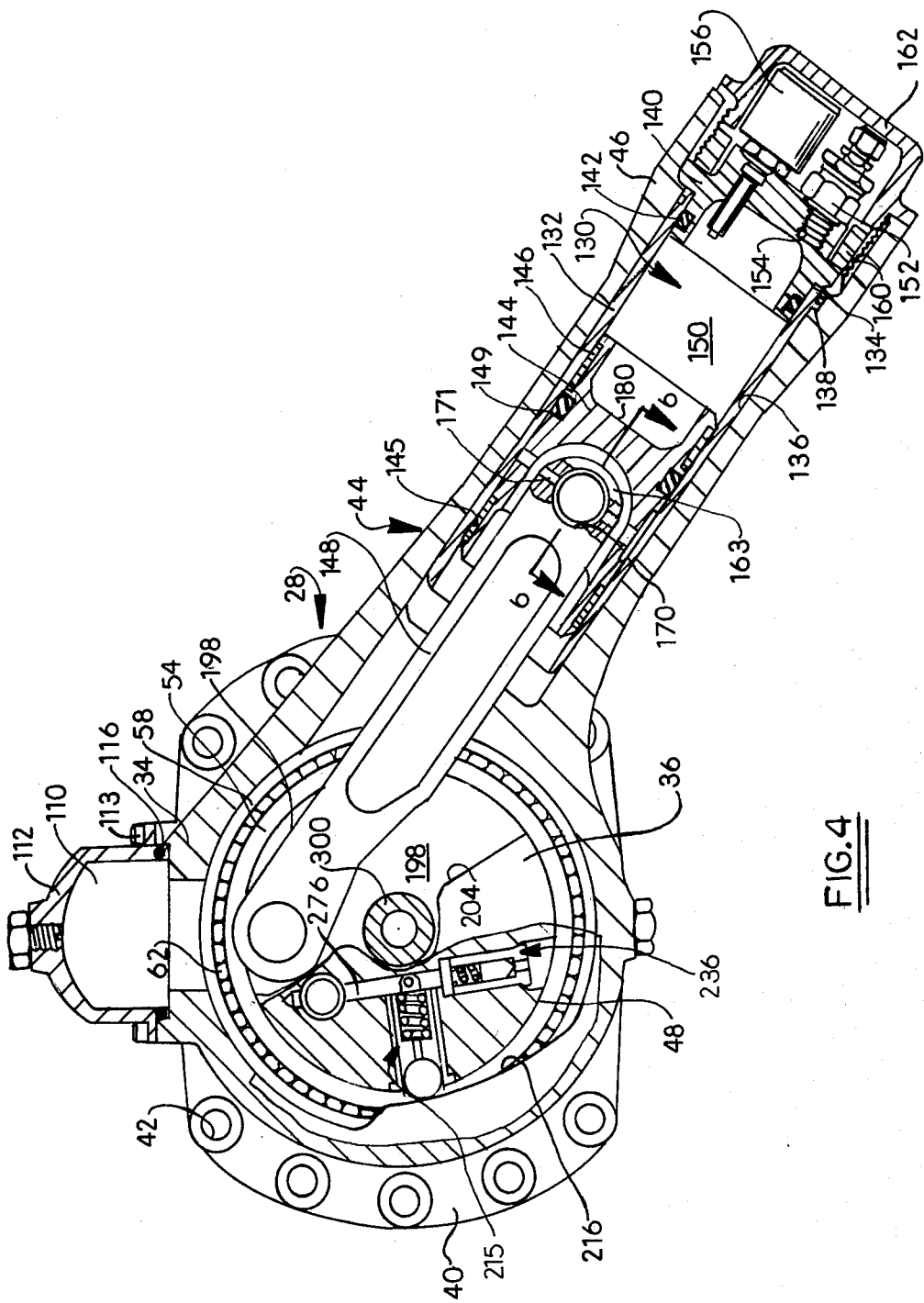
FIG. 4 is a sectional view taken along the line 4—4 of FIG. 3 looking in the direction of the arrows.

Each HSU 28, as shown in FIG. 3 and FIG. 4, is fixedly secured to the vehicle hull 26 by a large diameter road arm spindle 36 having both a registering diameter 38 and a mounting flange 40 with a plurality of bolt holes 42 as integral parts thereof. The diameter of the spindle 36 is selected for purposes which will become more apparent in the text and is larger than a diameter which heretofore has required in prior HSU assemblies. In such assemblies, as indicated above, the spindle was selected solely to meet structural requirements.

A road arm 44 having the spindle housing 34 at one end and a road wheel spindle 45 at the other free end 46 is supported for oscillation on the large outer diameter surface 48 of spindle 36 by complementary tapered roller bearings 50,52. Each bearing includes an inner race 54,56; an outer race 58,60; and a full complement of tapered rollers 62,64. Inboard bearing 50 has the inboard shoulder 66 of its inner race 54 seated on a spindle wall 68 and the outboard shoulder 70 of its outer race 58 seated on a spindle housing wall 72 thereby locating the axial position of the road arm in relation to the spindle. Outboard bearing 52 has the inboard shoulder 74 of its outer race 60 seated on a spindle housing wall 76 and the outboard shoulder 78 of its inner race extending outboard of spindle end 80. A chamfer 82 on the outboard shoulder 78 is engaged by the beveled surface 84 of a bearing load plate 86 held on spindle end 80 by a plurality of screws 88. A shim 90 of selected thickness located between the bearing load plate 86 and the spindle end 80 determines the preload in bearings 50,52. The large diameter but small cross-section preloaded full complement tapered roller bearings 50,52 support the road arm both axially and radially in a construction having a minimum volume and a narrow width.

A crankcase 92 is defined by the free volume enclosed within the spindle housing 34 and within the spindle 36. The crankcase is filled with fluid 94 to the level indicated on sight gage 96 mounted on cover plate 98. The fluid is retained in crankcase 92 at the outboard end of the spindle housing 34 by the cover plate 98 and O-ring seal 100. Cover plate 98 is fastened to spindle housing 34 by a plurality of screws 102. The fluid 94 is retained in crankcase 92 at the inboard end of the spindle housing 34 by a rotary shaft seal 104 located between shoulder 106 on the spindle housing and shoulder 108 on spindle 36. The fluid is retained in the crankcase at the inboard end of spindle 36 by the damper housing assembly 109.

An additional crankcase volume 110, best shown in FIG. 4, is provided by formed cover 112 which is mounted to spindle housing 34 by a plurality of screws 113 and sealed by O-ring 116. This volume which is located at the highest part of the unit provides space for fluid thermal expansion and for changes in internal volume associated with the road wheel rebounding below the static position while permitting the tapered roller bearings 50,52 and sleeve bearings 118,120 for supporting a crank pin 123 to be completely immersed in the fluid for lubrication and cooling.

A fluid fitting 123 is provided in cover 112 to permit both the initial filling and the maintenance of the fluid level. A pressure relief valve 124 is included in fitting 123 to relieve excessive crankcase pressure buildup. A second fluid fitting 126 is provided in spindle housing 34 to permit crankcase 92 to be drained. A magnetic trap 128 is included in fitting 126.

A mechanically operated, single chamber gas spring 130, as shown in FIG. 4, is included in the road arm. This spring supports that portion of the sprung mass of vehicle 10 that acts at the described road wheel station.

In accordance with certain principles of the present invention, a cylinder sleeve 132 including a shoulder 134 is close fit and axially located within a bore 136 including face 138 formed at the free end 46 of road arm 44. The cylinder sleeve 132 is closed at one end by a cylinder head 140 with an annular O-ring 142 therein that seals against the inside of the sleeve. A piston 144 is supported in sleeve 132 by a pair of glide rings 145,146 and axially located by a connecting bar 148. A piston seal 149 and O-ring seal 142 define a variable volume gas chamber 150. A charge fitting 152 is threaded into a bore 154 through head 140 for directing gas into chamber 150 to produce an initial static pressure in gas spring 130. A pressure gage 156 is threaded into bore 158 through head 140 to indicate and monitor the gas pressure. Cylinder head 140 and sleeve 132 are held in place by a ring 160 threaded into an internal thread at the free end 46. A cover 162 closes the structure.

Figure 6:
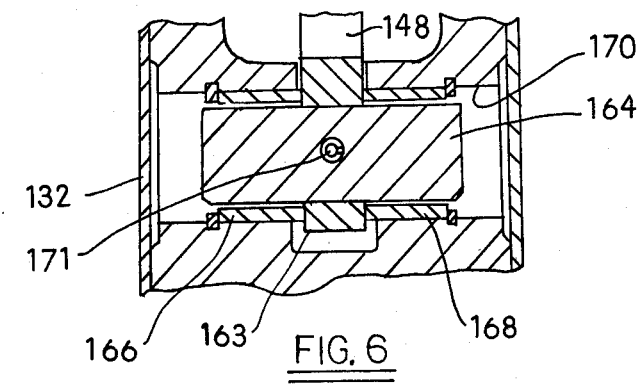
FIG. 6 is a cross-section taken along line 6—6 of FIG. 4.
Figure 7:
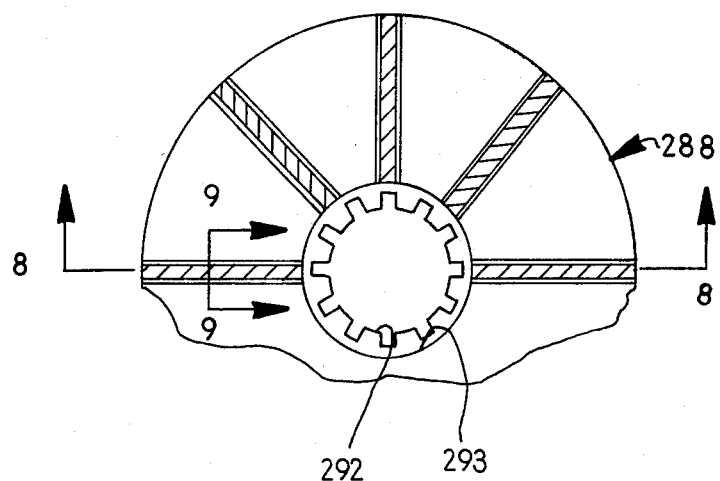
FIG. 7 is an elevation view of a friction disc.
Figure 8:
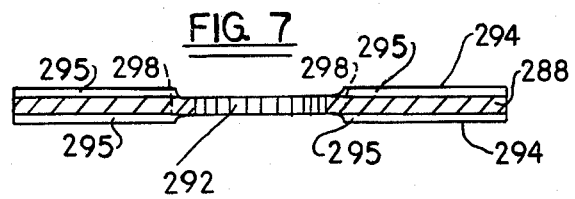
FIG. 8 is a cross-section taken along line 8—8 of FIG. 7.
Figure 9:
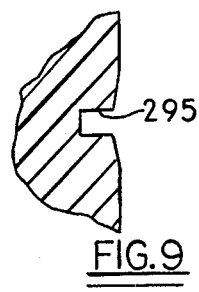
FIG. 9 is a cross-section taken along line 9—9 of FIG. 7.

As best seen in FIG. 6, connecting bar 148 has end 163 fastened to piston 144 by wrist pin 164 which is rotatably supported by sleeve bearings 166,168 press fit in bore 170 of piston 144. A pin 171 connects wrist pin 164 to end 163. The bar 148 passes through a rectangular slot 172 located between spindle housing walls at the closed end of bore 136.

The other end of connecting bar 148 is fastened by a pin 175 to crank pin 122 which is rotatably supported by sleeve bearings 118,120 press fit in spaced bores 174,176 in an upper portion 178 of spindle 36.

In contrast to prior constructions, connecting bar 148, within its elastic limits, will bend to accommodate lateral side loads. Thus, large expensive spherical bearing units to attach the drive bar to both spindle 36 and piston 144 are replaced by smaller lower cost two dimensional bearings. Additionally, these bearings do not increase the width or diameter of spindle housing 34 beyond those dimensions required for the installation of tapered roller bearings 50,52.

The initial static pressure ($P_s$) in gas spring 130 operating on face 180 of piston 144 produces a force (F) which is transmitted by connecting bar 148 to spindle 36. The amplitude of this force is equal to the product of the pressure (P), the area of face 180 (A), and the cosine of the angle $\alpha$ (cos $\alpha$) included between the centerline of piston 144 and the centerline of bar 148 (as shown HSU 28 has been designed so that angle $\alpha$ equals zero degrees at the static position) or:

$$F = P_s A \cos \alpha \quad (1)$$

The direction of this force is along the centerline of bar 148.

This force acts at an effective radius ($r_1$) which is the perpendicular distance between the centerline of bearings 50,52 and the centerline of bar 148 to produce a moment around the centerline of the bearings. An equal and opposite moment reacts on road arm 44. The vertical sprung weight ($F_v$) of vehicle 10 acts at the described HSU 28 at an effective radius ($r_2$) which is the horizontal distance between the centerline of bearings 50,52 and the centerline of a wheel spindle 45 on free end 46 to produce a second moment about bearings 50,52. Equating these moments to zero and solving for Fv yields:

$$F_v = \frac{PA \cos \alpha \, r_1}{r_2} \quad (2)$$

Figure 2:
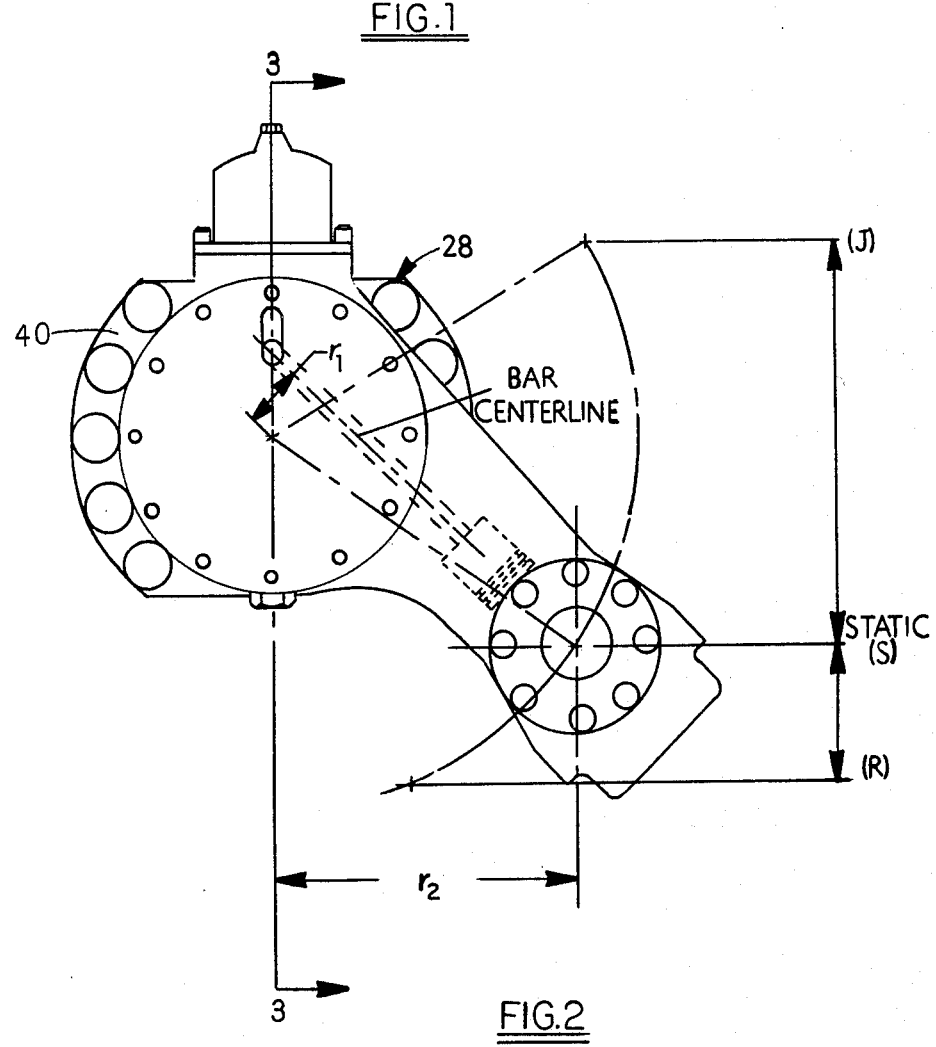
FIG. 2 is a side elevation view of the present invention with road arm movements, the effective radius ($r_1$) of the road arm, the centerline of the connecting bar and the effective radius ($r_2$) of the connecting bar superimposed thereon.

The volume of gas chamber 150 at any road arm position is equal to the initial volume ($V_s$) at the static position (S) in FIG. 2 plus or minus the displacement of ($X_p$) of piston 144 times its area A or:

$$V = V_s \pm X_p A \quad (3)$$

Figure 10:
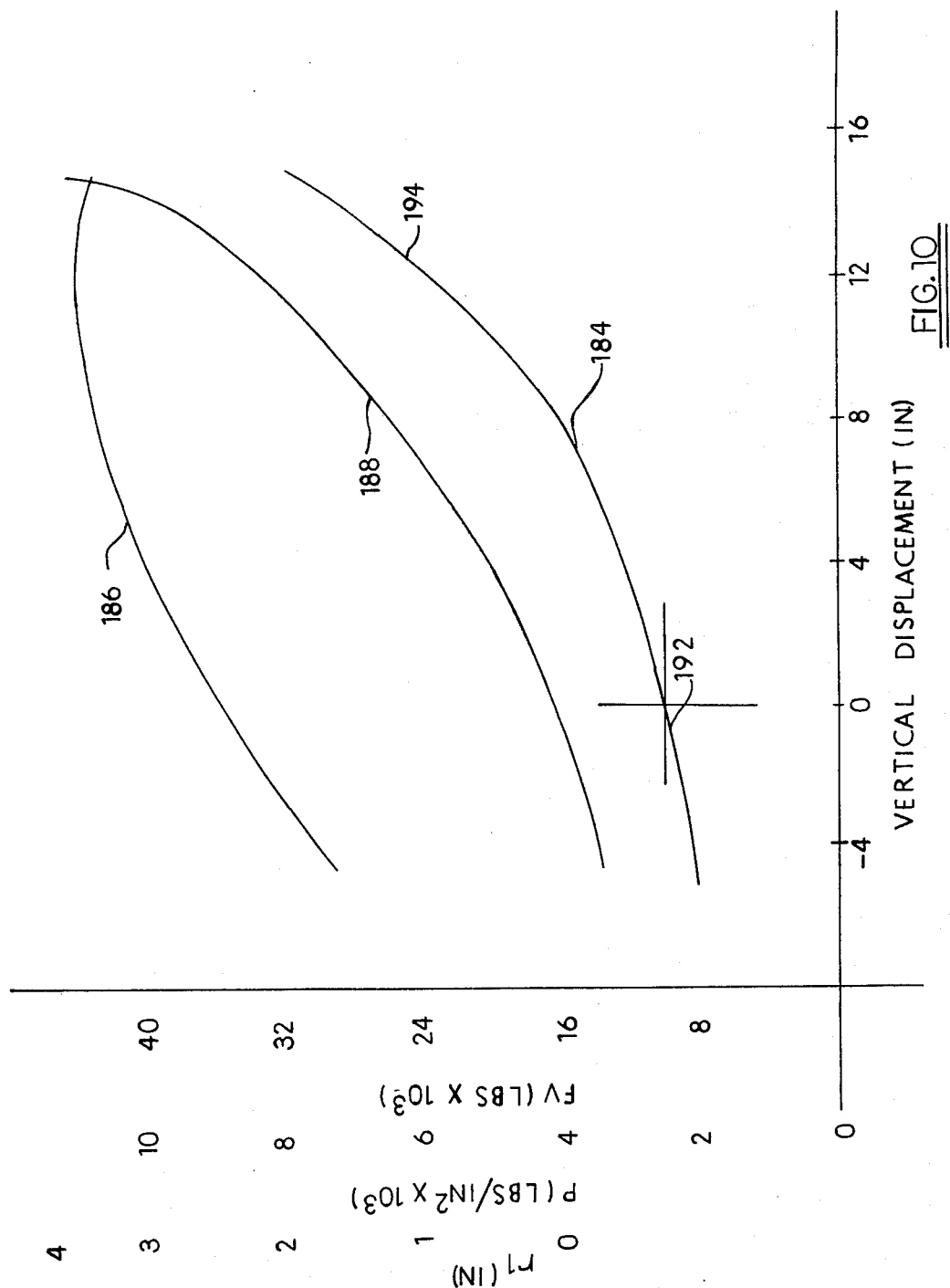
FIG. 10 is a graph of the vertical wheel force (spring characteristics), the change in the effective radius of the connecting bar ($r_1$), and the displacement of the piston ($X_p$) versus vertical wheel travel for the present invention.

The pressure that corresponds to this volume is determined by the adiabatic expansion or compression of gas in the variable volume chamber 150 or:

$$P = \frac{P_s}{1}\left(\frac{V_s}{V}\right)^\gamma \quad (4)$$

Where the factor $\gamma$ is the ratio of the specific heat of the selected gas at constant volume to the specific heat at constant pressure values are available in published tables. For all displacements of the road arm the piston displacement ($X_p$), the angle ($\alpha$), the effective connecting bar radius ($r_1$), and the effective road arm radius ($r_2$) may be determined by graphical or numerical means. Substituting these values in equations (2), (3), and (4) will permit the vertical force ($F_v$) to be calculated for each displacement. Curves of this spring characteristic 184, the change in ($r_1$) 186, and the change in (P) 188 are shown in FIG. 10.

An examination of the curves for the inventive arrangement shows that by locating crank pin 122 at the illustrated position in spindle 36, displacements of road arm 34 at and around the static position (S) cause the effective crank radius ($r_1$) to change rapidly and the piston pressure (P) to change slowly; and for displacements of road arm 34 at and near the jounce position (J) the effective crank radius ($r_1$) is caused to change slowly and the piston pressure (P) is caused to change rapidly wherein the shape of the resultant spring characteristic curve 184 is considerably modified and improved compared to that of prior systems.

The resultant spring characteristic has a dual rate, an initial lower rate represented by curve segment 192 and a final higher rate represented by curve segment 194. Lower rate 192 at and near the static position (S) is approximately twice that of prior systems. It provides an optimum compromise between the need to properly equilibrate the vehicle for changes in gross vehicle weight, shifts in the vehicle center of gravity, and changes in the ambient and operating conditions; and the desire to minimize disturbances to hull 26 when road arm 44 is displaced. Higher rate 194 near jounce position (J) in combination with the large amplitude jounce travel prevent the road arms 44 from striking bump stops 196 on hull 26 at all but the most extreme obstacle produced displacements of track systems 12.

Location of crank pin 122 in the described position requires connecting bar 148 in operation from rebound (R) to jounce (J) to intersect and sweep a large part of the cross sectional area of spindle 34 in a plane located axially between bearings 50,52. A slot 198 in spindle 34 bounded by walls 200,202,204, as shown in FIGS. 3 and 4, permits connecting bar 148 to travel through the swept area and the remaining section of the large diameter spindle 36 retains properties capable of providing the required structural strength and rigidity.

In the past, damping systems of conventional in-arm suspension units have used restrictions to the flow of fluid between the fluid piston and the gas/fluid separator of a hydropneumatic spring to damp the vehicle oscillations as a function of piston direction of motion and velocity. Such restrictions absorb energy from the system and convert this energy to heat. The heat which is generated has to be dissipated to the surrounding atmosphere from the limited surface area of the arm (which may be caked with dried mud). The resultant increase in temperature causes increases in the fluid volume and the gas pressure which adversely affect the vehicle's height and attitude.

Figure 5:
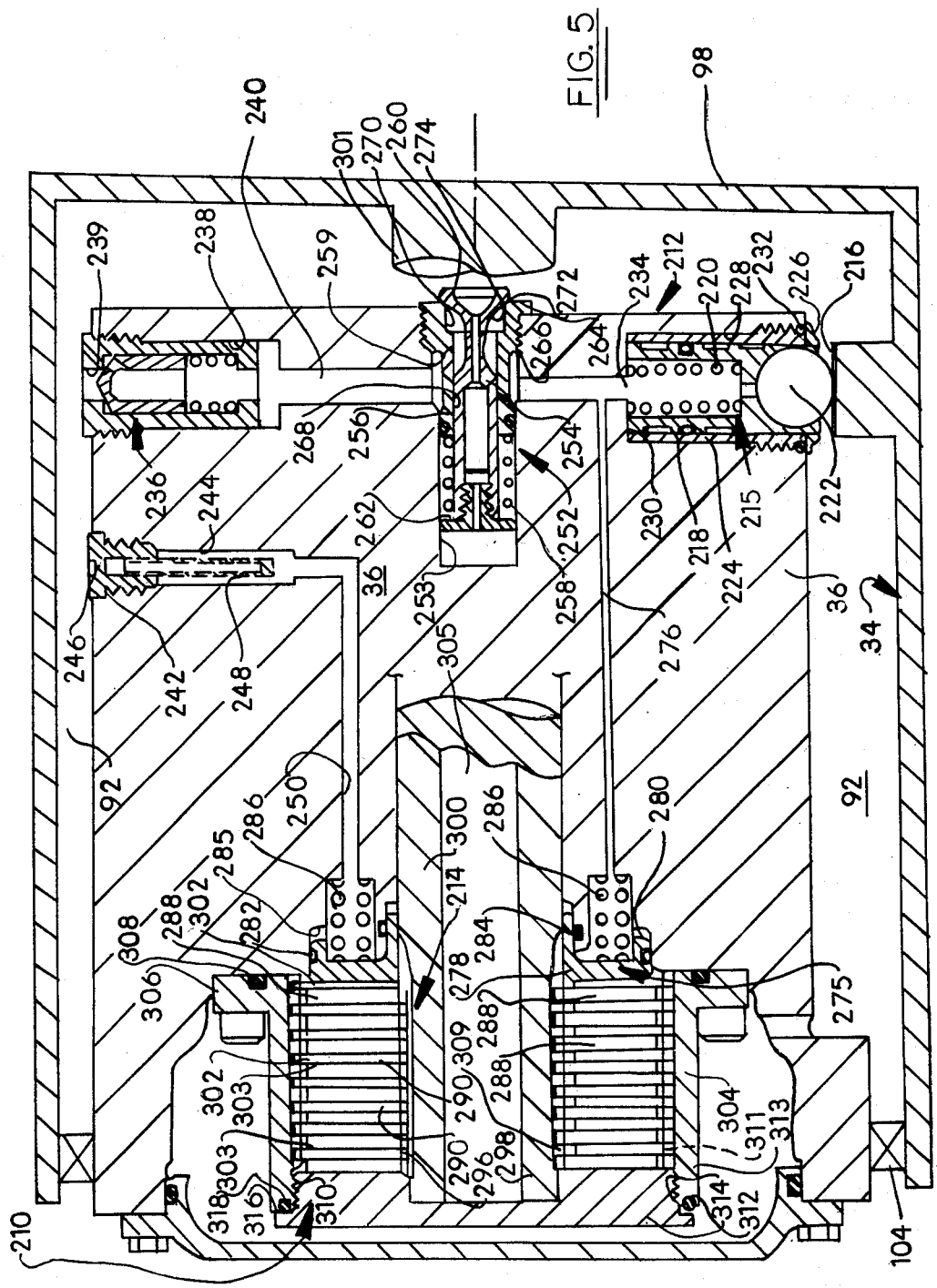
FIG. 5 is a schematic view of the in-spindle damping system of the present invention.

The present invention has a hydraulically controlled rotary friction damper system 210 diagrammatically shown in FIG. 5. System 210 is located remote from gas spring 130 in spindle 36, and operated independently of the spring drive mechanism, which damps the vehicle oscillations as a function of road arm 44 direction of rotation, displacement, and velocity, pressure-flow characteristics of hydraulic control system 212, friction-velocity characteristics of a rotary damper 214. Damper system 210 provides improved dynamic suspension system performance and solves the heat dissipation problem of conventional in-arm systems.

More particularly, with reference to FIGS. 3, 4, and 5, damper system 210 includes the following components.

A cam surface 216 is formed as an integral part of the interior surface of spindle housing 34 located between housing walls 72,76. The cam 216 causes a pump piston 218 having a spring 220 at one end and a hydrostatically balanced and mechanically retained ball follower 222 at the opposite end to be displaced relative to pump sleeve 224. Pump sleeve 224 including a shoulder 226 is retained, fit, and axially located within a bore 228 including face 230 formed in spindle 36. Bore 228 is closed at the spring end and sealed by 0-ring 232 at the ball follower end. A pump chamber 234 is defined by the volume between the closed end of bore 228 and seal 232. Fluid 94 in chamber 234 is pumped through passage 235 in spindle 36 to the hydraulic control system when cam 216 displaces piston 218 toward the closed end of bore 228.

A cartridge check valve assembly 236 is disposed within a bore 238 formed in spindle 36. The valve 236 permits fluid 94 in crank case 92 through valve inlet port 239 and passage 240 in spindle 36 to replenish pump chamber 234 when cam 216 allows spring 220 to displace piston 218 toward the open end of bore 228.

A damper orifice assembly 242 is retained within a bore 244 formed in spindle 36. The assembly 242 includes a small diameter orifice 246 and a filter 248. Passage 250 connects bore 244 to the hydraulic control system and orifice 246 permits fluid 94 to flow directly to crankcase 92. The pressure-flow characteristics of orifice 246 determine the pressure in the hydraulic control system as a function of the velocity of piston 218.

A large capacity cartridge pressure relief valve 252 is disposed within bore 253 formed in spindle 36. The valve assembly 252 includes a valve stem 254, a valve sleeve 256 and a spring 258. In this arrangement valve stem 254 has a shaped poppet 260 at one end and a spring retainer 262 threaded into an internal thread at the other end. Valve sleeve 256 has a shoulder 264 and an external thread 266 at one end which locates and fixes the sleeve in bore 253 and a face which retains one end of spring 258 at the other end. Bore 268 in sleeve 256 guides and supports valve stem 254. Bore 268 has an increased diameter 270 and a shaped valve seat 272 at its threaded end. Diameter 270 provides a small differential area upon which hydraulic control system pressure acts to open valve 252. Spring 258 biases the conical surface 274 of poppet 260 against valve seat 272. A relatively small spring force is required to maintain valve 252 in its closed position at the maximum desired control system pressure. When the flow from pump piston 218 through damping orifice 246 causes the control system pressure to increase to the maximum desired pressure the additional flow from the pump is vented to crankcase 92 by relief valve 252. The shaped valve seat 272 in conjunction with the shaped poppet 260 causes this flow to rotate through a large angle at a high velocity thereby exerting a reaction force on poppet 260. This force is in a direction which will oppose the preload in the valve spring 258 and tend to open valve 252 wider for relief flow through passages 259 in sleeve 252. The pressure drop associated with the rotation of the fluid is less than that required to overcome the preload in spring 258. Thus there is a large reduction in the control system pressure at those high flows associated with a road wheel 22 traversing a discrete obstacle at moderate to high speeds of vehicle 10.

A hydraulic actuator 275 is connected to the hydraulic control system 212 by passage 276. The actuator 275 produces a force which is proportional to the control system pressure and which acts in a direction normal to a rotary damper 214. An actuator piston 278 is contained in bore 280 of spindle 36. Seals 282 and 284 retain the fluid pressure and form a pressure chamber 285. A spring 286 in chamber 285 biases the piston 278 to preload the friction damper 214. The rotary friction damper 214 is of the wet type and includes a plurality of rotating discs 288 and a plurality of stationary discs 290. Each of the rotating discs 288 has an internally splined surface 292; friction facings 294 are included on both sides of each disc 288; and each disc 288 includes both axial and radial passages 293,295 for the flow of crankcase fluid as a coolant. The internal splines 292 are slidably engaged on an externally splined surface 296 on one end 298 of a drive shaft 300. The other end 301 of the shaft 300 is rotatably and axially fixed in cover plate 98, thereby transmitting torque from the damper 214 to the spindle housing 34, the road arm 44, and then to the road wheel 22. The stationary discs 290 each have an external spline 302 and flat, hard, smooth faces 303 on each side thereof. The external splines 302 are slidably engaged on an internal spline in damper housing 304. Shaft 300 has a central bore 305 communicating through passages 307 (FIG. 3) with crankcase 92 to direct cooling oil to shaft grooves 309 thence through radial passages 295 in rotating discs 288. Damper housing 304 includes axial and radial passages 311,313 to permit the flow of cooling fluid from the damper to the crankcase, housing flange 306 is bolted to the inboard end of spindle 36. It has a seal 308 which retains the crankcase fluid, and an internal thread 310 in its inboard end. An end plate 312 which limits the axial movement of the damper discs has an external thread 314 which engages thread 310. A shoulder 316 on end plate 312 locates the damper discs axially. A seal 318 between shoulder 316 and the inboard face (C) damper housing 304 completes the enclosure of the crankcase fluid.

In operation, the radial passages 295 in the rotating discs 288 act as a pump which circulates fluid outwardly through the damper. This fluid washes the generated heat off the faces 303 of the stationary discs 290 which absorb the heat on a transient basis.

The friction coefficient of the friction facings 294 is higher at low velocities than it is at high velocities thereby reducing the damping at these velocities associated with road wheel 22 traversing discrete obstacles.

In addition, the radial passages 295 in the rotating discs 288 are configured so that at high velocities, a hydrodynamic pressure is developed between the discs which further reduces the damping.

The damping characteristics of HSU 28 are shown in FIG. 11. These characteristics are the result of the location, extent, and shape of cam surface 216, the pressure-flow characteristics of damper orifice 246 and relief valve 252, and the friction-velocity characteristics of multiple disc damper 214. Two curves are shown. Curve 320 depicts the damping force at road wheel 22 as a function of the vertical velocity of the wheel displacements near static position (S). Curve 322 depicts the damping force at road wheel 22 as a function of the vertical velocity of the wheel for displacements near jounce position (J).

A close examination of curve 320 of the inventive arrangement reveals that the initial segment 324 of the curve for velocities in the jounce direction results from the bias provided by spring 286 and the static friction of the preloaded bearings and seals, that the next segment 326 results from damper orifice 246 pressure-flow characteristics, that segment 328 results from the preload in spring 258 of pressure relief valve 252, and that the final segment 330 is a function of the pressure-flow characteristics of relief valve 252 and the friction-velocity characteristics of multiple disc damper 214. For velocities in the rebound direction the initial segment 332 is similar to segment 324 and the remaining segment 334 results from the friction-velocity characteristics of multiple disc damper 214.

An examination of curve 322 shows that it is primarily a function of the shape of cam 216 which has a very small rise in this section of the displacement of road wheel 22.

The components of the damping system can be readily modified or selected to provide an optimum amount of damping to control the pitching and heaving of the hull 26 as the vehicle traverses terrain of various degrees of roughness while limiting the disturbances of the hull, stress in the suspension and running gear, and the amount of heat generated in the damper at displacements and velocities associated with the road wheel 22 traversing discrete obstacles.

The heat generated by the damper 214 is transferred to crankcase fluid 94 which is caused to circulate through the damper 214 by the pumping action of the rotating friction discs 288. The heated fluid is then further circulated by the pumping action of the tapered roller bearings 50,52, the flow from the inlet check valve 236 to the output of the damping orifice 242 and of the pressure relief valve 252, and the relative motion between the spindle housing 34 and the spindle 36. The circulating fluid transfers a portion of the heat to the large inner surface of the spindle housing 34 and the cover 98. This heat is then conducted through the walls of these members to their large outer surfaces where it is dissipated to the surrounding atmosphere by the flow of air over these surfaces at an average velocity equal to the velocity vehicle 10. Another portion of the heat is transferred by the circulating fluid to the surfaces of the spindle 36. This heat is then conducted to the large mounting flange 40 where it is transferred to the hull 26 of vehicle 10. The remainder of the heat is absorbed by the increase in temperature of the fluid 94 and of the spindle 36, the spindle housing 34, and the components contained therein. These portions of the HSU 28 represent a major portion of its weight and thereby provide a large heat sink for the storage of energy during periods of peak energy generation. In this manner the HSU 28 is capable of handling both the steady state and transient requirements imposed by the vehicle's operation without causing the fluid to overheat and without adversely affecting the characteristics of the gas spring which is located remote from the damper and its primary heat transfer paths to ambient air.

HSU 28 in addition to providing improved performance utilizes in its construction the same material in combination as a structure to transmit the road wheel forces to the hull, as a mount and as a container for the spring and the damper, and as an efficient means of absorbing and dissipating the heat generated by the damper; thereby providing a suspension system of reduced size, weight, and cost. It does not intrude into the hull permitting the volume under armor to be used most effectively thereby reducing the overall vehicle weight and height. It fits in the available space between the side of a vehicle and the road wheel simplifying the construction and improving the armor configuration of the hull. It permits the use of a short road arm length without limiting the vertical travel of the road wheel or interfering with the track. This short length reduces the unsprung weight and reduces the bending and twisting moments imposed by the vertical and lateral wheel loads. It simplifies the maintenance and repair, reduces vehicle fuel consumption, and increases the durability of the running gear.

The hydropneumatic suspension unit 28 is a cost effective addition to both existing and new armored vehicles. It provides a superior level of performance. It is durable and requires a minimum of maintenance. Its initial cost is low. It reduces the vehicle life cycle cost.

While the embodiment of the present invention, as herein disclosed, constitutes a preferred form, it is to be understood that other forms might be adopted.

The embodiments of the invention in which an exclusive property or privilege is claimed are defined as follows:

1. A self-contained road wheel suspension system comprising in combination: a spindle fixedly secured to a vehicle hull, a road arm having a spindle housing on one end and a road wheel support on the opposite end thereof, bearing means for supporting said spindle housing for rotation relative to said spindle, a fluid filled crankcase defined by said spindle housing and said spindle, a shaft seal retaining said fluid, means defining mechanically operated gas spring means at the opposite end of said road arm including means coupled to said spindle for producing a spring force on the vehicle hull, a mechanically operated fluid controlled damper means remote from said gas spring means and included within said spindle for damping movement of said road arm with respect to said spindle, said damper means constituting the sole damper means in said road arm for converting energy of motion to heat, and means for absorbing and dissipating said heat without adversely affecting the performance of said gas spring means.

2. A self-contained road wheel suspension system comprising in combination; a spindle fixedly secured to a vehicle hull, a road arm having a spindle housing on one end and a road wheel support on the opposite end thereof, bearing means for supporting said spindle housing for rotation relative to said spindle, a fluid filled crankcase defined by said spindle housing and said spindle, a shaft seal retaining said fluid, means defining mechanically operated gas spring means at the opposite end of said road arm including means coupled to said spindle for producing a spring force on the vehicle hull, a mechanically operated fluid controlled damper means remote from said gas spring means and included within said spindle for damping movement of said road arm with respect to said spindle, means for removing heat from said damper means, means for absorbing and dissipating said heat without adversely affecting the performance of said gas spring means, said damper means including a variable height cam surface on said spindle housing, fluid pump means in said spindle having piston means driven by said cam surface to produce a flow as a result of the direction of rotation, the displacement, and the velocity of said spindle housing, fluid control means in said spindle to produce a pressure as a result of said flow, fluid actuator means in said spindle to produce a force as a result of said pressure, and friction means in said spindle to produce a retarding torque on said spindle housing as a result of said force and the velocity of said housing, said friction torque removing energy from said system and said vehicle hull to damp oscillations thereof and to convert oscillating energy to heat.

3. A self-contained road wheel suspension system comprising in combination, a spindle fixedly secured to a vehicle hull, a road arm having a spindle housing on one end and a road wheel support on the opposite end thereof, bearing means for supporting said spindle housing for rotation relative to said spindle, a fluid filled crankcase defined by said spindle housing and said spindle, a shaft seal retaining said fluid, means defining mechanically operated gas spring means at the opposite end of said road arm including means coupled to said spindle for producing a spring force on the vehicle hull, a mechanically operated fluid controlled damper means remote from said gas spring means and included within said spindle for damping movement of said road arm with respect to said spindle, means for removing heat from said damper means, and means for absorbing and dissipating said heat without adversely affecting the performance of said gas spring means, said damper means including a variable height cam surface on said spindle housing, fluid pump means in said spindle having piston means driven by said cam surface to produce a flow as a result of the direction of rotation, the displacement, and the velocity of said spindle housing, fluid control means in said spindle to produce a pressure as a result of said flow, fluid actuator means in said spindle to produce a force as a result of said pressure, and friction means in said spindle to produce a retarding torque on said spindle housing as a result of said force and the velocity of said housing, said friction torque removing energy from said system and said vehicle hull to damp oscillations thereof and to convert oscillating energy to heat, means for supporting said spindle housing including a pair of full complement tapered roller bearings located at spaced axial points on said spindle, said cam means located on said spindle housing between said bearings, said fluid pump means including reciprocating piston and inlet means for charging said pump with said crankcase fluid, said piston having a spring at one end and a cam follower at the other end thereof, said follower being an anti-friction means that reaches between said bearings to said cam surface, said pump being charged when said housing rotates in a first direction and discharging a flow of fluid during opposite rotation.

4. A self-contained road wheel suspension system comprising in combination, a spindle fixedly secured to a vehicle hull, a road arm having a spindle housing on one end and a road wheel support on the opposite end thereof, bearing means for supporting said spindle housing for rotation relative to said spindle, a fluid filled crankcase defined by said spindle housing and said spindle, a shaft seal retaining said fluid, means defining a mechanically operated gas spring means at the opposite end of said road arm including means coupled to said spindle for producing a spring force on the vehicle hull, a mechanically operated fluid controlled damper means remote from said gas spring means and included within said spindle for damping movement of said road arm with respect to said spindle, means for removing heat from said damper means, and means for absorbing and dissipating said heat without adversely affecting the performance of said gas spring means, said damper means including a variable height cam surface on said spindle housing, fluid pump means in said spindle having piston means driven by said cam surface to produce a flow as a result of the direction of rotation, the displacement, and the velocity of said spindle housing, fluid control means in said spindle to produce a pressure as a result of said flow, fluid actuator means in said spindle to produce a force as a result of said pressure, and friction means in said spindle to produce a retarding torque on said spindle housing as a result of said force and the velocity of said housing, said friction torque removing energy from said system and said vehicle hull to damp oscillations thereof and to convert oscillating energy to heat, said fluid control means including fluid metering means and fluid pressure relief means, said fluid metering means being an orifice to produce a pressure in said system as a result of the increase in flow from said pump means said pressure relief means having a large capacity differential area poppet valve and a spring biasing said valve to relieve said pressure at a predetermined level and having a formed poppet and seat to produce a flow force to further oppose said spring and thereby control said pressure as a result of increased flow from said pump.

5. A self-contained road wheel suspension system comprising in combination, a spindle fixedly secured to a vehicle hull, a road arm having a spindle housing on one end and a road wheel support on the opposite end thereof, bearing means for supporting said spindle housing for rotation relative to said spindle, a fluid filled crankcase defined by said spindle housing and said spindle, a shaft seal retaining said fluid, means defining mechanically operated gas spring means at the opposite end of said road arm including means coupled to said spindle for producing a spring force on the vehicle hull, a mechanically operated fluid controlled damper means remote from said gas spring means and included within the outer diameter of said spindle for damping movement of said road arm with respect to said spindle, means for absorbing and dissipating said heat from said damper means without adversely affecting the performance of said gas spring means, damper means including a variable height cam surface on said spindle housing, fluid pump means in said large diameter spindle having piston means driven by said cam surface to produce a flow as a result of the direction of rotation, the displacement, and the velocity of said spindle housing, fluid control means in said spindle to produce a pressure as a result of said flow, fluid actuator means in said spindle to produce a force as a result of said pressure, and friction means in said spindle to produce the retarding torque on said spindle housing as a result of said force and the velocity of said housing, said friction torque removing energy from said system and said vehicle hull to damp oscillations thereof and to convert oscillating energy to heat, said fluid actuator means including a fluid chamber in said spindle, a piston slideably mounted in said chamber, and a spring to provide an initial bias on said piston to produce a force acting normal to said friction means as a result of the pressure in said fluid control system and said spring bias, said friction means including a plurality of first disc means fixed to said spindle and further including a plurality of second disc means having connecting means to said spindle housing to produce a retarding torque on said spindle housing as a result of said normal force and as a result of the friction/velocity characteristics of said first and second disc means.

6. In the combination of claim 5, said second disc means having a plurality of formed radial grooves on each face, said grooves acting to pump crankcase fluid between said first and said second discs as a result of the rotation of said second discs to produce cooling of said discs, said grooves further acting to develop a hydrodynamic pressure between said discs to reduce said retarding torque at high spindle housing velocities.

* * * * *